United States Patent [19]

Wu

[11] Patent Number: 5,477,143

[45] Date of Patent: Dec. 19, 1995

[54] SENSOR WITH MAGNETORESISTORS DISPOSED ON A PLANE WHICH IS PARALLEL TO AND DISPLACED FROM THE MAGNETIC AXIS OF A PERMANENT MAGNET

[75] Inventor: Mien T. Wu, Dane County, Wis.

[73] Assignee: Honeywell Inc., Minneapolis, Minn.

[21] Appl. No.: 179,800

[22] Filed: Jan. 11, 1994

[51] Int. Cl.$^6$ ............................ G01B 7/14; G01R 33/022
[52] U.S. Cl. .................. 324/207.21; 324/252; 338/32 R
[58] Field of Search .................. 324/207.21, 207.24, 324/207.25, 252, 166, 173, 174, 207.22, 207.23, 260, 262, 207.26; 338/32 R, 32 H

[56] References Cited

U.S. PATENT DOCUMENTS

| | | | |
|---|---|---|---|
| 4,079,360 | 3/1978 | Ookubo et al. | 338/32 R X |
| 4,401,944 | 8/1983 | Narimatsu et al. | 338/32 R |
| 4,506,217 | 3/1985 | Ruthless et al. | 324/207.21 |
| 4,673,827 | 6/1987 | Sommer | 324/207.21 X |
| 4,712,064 | 12/1987 | Eckardt et al. | 324/207.21 |
| 4,725,776 | 2/1988 | Onodera et al. | 324/207.21 |
| 4,745,363 | 5/1988 | Carr et al. | 324/251 X |
| 4,853,632 | 8/1989 | Nagano et al. | 324/207.21 |
| 4,970,463 | 11/1990 | Wolf et al. | 324/207.2 |
| 5,021,736 | 6/1991 | Gonsalves et al. | 338/32 R |
| 5,038,130 | 8/1991 | Eck et al. | 338/32 R |
| 5,055,781 | 10/1991 | Sakakibara et al. | 324/207.21 |
| 5,327,077 | 7/1994 | Honda | 324/207.21 |
| 5,341,097 | 8/1994 | Wu | 324/207.2 |

FOREIGN PATENT DOCUMENTS

| | | | |
|---|---|---|---|
| 0073618 | 5/1982 | Japan | 324/207.21 |
| 0086405 | 5/1983 | Japan | 324/207.21 |
| 0021580 | 6/1985 | Japan . | |
| 0016922 | 1/1989 | Japan | 324/207.21 |
| 4095817 | 3/1992 | Japan | 324/207.21 |

Primary Examiner—Sandra L. O'Shea
Assistant Examiner—Jay M. Patidar
Attorney, Agent, or Firm—William D. Lanyi

[57] ABSTRACT

A proximity sensor has two magnetoresistive elements in a common plane and displaced from a lateral surface of a permanent magnet. The common sensing plane of the magnetoresistive elements extends in a direction generally parallel to a magnetic axis of a permanent magnet that extends between the north and south poles of the magnet. A detection zone is defined relative to a preselected magnetic pole face and the magnetoresistive elements provide first and second signals that can be compared to define a third signal which is representative of the presence or absence of the magnetically permeable object within the detection zone. The magnetoresistive elements can each have a plurality of magnetoresistors which are arranged in a Wheatstone bridge configuration for the purpose of providing the first and second signals described above.

13 Claims, 9 Drawing Sheets

SENSOR WITH MAGNETORESISTORS DISPOSED ON A PLANE WHICH IS PARALLEL TO AND DISPLACED FROM THE MAGNETIC AXIS OF A PERMANENT MAGNET

BACKGROUND OF THE INVENTION

1. Field of the Invention

The present invention is generally related to a proximity sensor and, more specifically, to a sensor which utilizes magnetoresistive elements to determine the presence of magnetically permeable material within a predefined detection zone proximate one of the magnetic poles of a permanent magnet.

2. Description of the Prior Art

Many different types of proximity sensors are known to those skilled in the art. Some of these sensors utilize permanent magnets to detect the presence or absence of a magnetically permeable object within a certain predefined detection zone relative to the sensor. In combination with the permanent magnet, some sensors of this type utilize Hall effect elements located at particular positions relative to the permanent magnet and other sensors utilize magnetoresistive elements disposed at advantageous position relative to the permanent magnet. Proximity sensors of this type, whether they use Hall effect elements or magnetoresistive elements, can be configured to sense the presence or absence of a magnetically permeable object passing through a detection zone in a direction generally perpendicular to a central axis of the permanent magnet or, alternatively, can be configured to detect the distance of a magnetically permeable object moving in a direction toward or away from a pole face of the permanent magnet along with a path that is generally parallel to the central axis of the magnet.

U.S. Pat. No. 4,970,463, which issued to Wolf et al on Nov. 13, 1990, describes a temperature stable proximity sensor which senses magnetic flux emanating from the lateral surface of a permanent magnet. The ferrous object sensor is capable of sensing the presence or absence of an object of high magnetic permeability, such as a tooth or a notch on a rotatable mounted ferrous wheel at zero speed and immediately upon power-up. The device can therefore be used as a proximity sensor. It comprises a permanent magnet and a magnetic flux responsive sensor which has a sensing plane and which produces an electrical output signal that varies as a function of the change in magnetic flux density. The ferrous body sensor assembly does not rely upon pole face magnetism as some known conventional sensors do but, instead, relies upon the radial component of magnetic flux density emanating from a lateral surface of the magnet between the opposing pole faces. Since the ferrous object sensor assembly does not rely on pole face magnetism, its electrical output signal is relatively stable over a relatively wide temperature range.

U.S. Pat. No. 4,506,217, which issued to Rothley et al on Mar. 19, 1985, describes a geartooth position and speed sensor with four magnetic resistance tracks connected in a bridge circuit arrangement. To simplify a field plate effect speed and position sensor, four meander-arranged permalloy resistance tracks are located on a substrate at the corners of a rectangle. They are spaced, in the circumferential direction, by approximately half the pitch distance of the teeth of a gear. The resistance can be connected in a voltage divider configuration or in the form of a bridge circuit supplied with a constant current source to eliminate temperature variation effects. In a preferred embodiment, the resistances are formed as meander-shaped thin film vapor deposited tracks on a silicon substrate. A permanent magnet is used to provide bias magnetization.

In proximity sensors of the general type described above, a magnetically sensitive component is generally used to provide a signal representing the strength of a magnetic field in a particular direction. If a Hall effect element is used in association with the permanent magnet, the signal from the Hall element represents the magnetic field strength component in a direction perpendicular to the sensing plane of the Hall device. If, on the other hand, a magnetoresistive element is used in association with the permanent magnet, the signal from the magnetoresistive element represents the magnetic field strength in a direction within the sensing plane of the magnetoresistive element and perpendicular to its thinnest dimension. Depending on the particular application and performance requirements of the sensor, either Hall effect elements or magnetoresistors can be used. Throughout the literature describing the prior art, sensors of this general type are occasionally described as proximity sensors and alternatively described as geartooth sensors, depending on the intended application of the sensor.

In most proximity sensors, several attributes are advantageous. For example, in a geartooth sensor used in association with an internal combustion engine, an advantageous characteristic is the ability to provide a signal upon startup that identifies the presence or absence of a geartooth in a predefined detection zone without the necessity of gear movement. This is known as a power-up recognition capability. Another advantageous characteristic of a geartooth sensor or a proximity sensor is its reduced size. The size of a proximity sensor is usually affected by the size of the permanent magnet and the relative positions of the magnetically sensitive component and the permanent magnet.

SUMMARY OF THE INVENTION

A preferred embodiment of the present invention comprises a permanent magnet which has a north magnetic pole and a south magnetic pole with a magnetic axis extending therebetween. The permanent magnet, which can be rectangular or circular in cross section, has a lateral surface the extends generally parallel to the magnetic axis. A detection zone is located external to the permanent magnet and displaced from a preselected one of the north and south poles. The magnetic axis generally extends through the detection zone. A first magnetoresistive element is disposed in a sensing plane which is generally parallel to the magnetic axis. A second magnetoresistive element is disposed in the sensing plane and the sensing plane is displaced from the lateral surface of the permanent magnet. In one embodiment of the present invention, the first and second magnetoresistive elements are displaced from the preselected north or south magnetic pole in a direction toward the detection zone. In a particularly preferred embodiment of the present invention, a means is provided for comparing first and second signals from the first and second magnetoresistive elements and also providing a third signal which is representative of the amount of magnetically permeable material within the detection zone. The third signal is provided as a function of the first and second signals.

The first and second magnetoresistive elements of the present invention can comprise permalloy material. The means for comparing the first and second signals from the first and second magnetoresistive elements can comprise a Wheatstone bridge arrangement. In addition, each of the first and second magnetoresistive elements can comprise more than one magnetoresistor. For example, the two magnetoresistive elements can comprise four magnetoresistors in which the first magnetoresistive element comprises the first and third magnetoresistors and the second magnetoresistive element comprises the second and fourth magnetoresistors. The first and fourth magnetoresistors can be connected electrically in series to form a first leg of a Wheatstone bridge and the second and third magnetoresistors can be connected electrically in series to form a second leg of the Wheatstone bridge. The first and second legs of the Wheatstone bridge can then be connected electrically in parallel with each other to provide the means for comparing the first and second signals from the first and second magnetoresistive element.

In one particular embodiment of the present invention, the first and third magnetoresistors are disposed in laminar association with each other and the second and fourth magentoresistors are disposed in laminar association with each other. If these magnetoresistors are associated directly on top of each other, in laminar association, the effects of the magnetic field are virtually identical on the first and third magnetoresistors and virtually identical on the second and fourth magnetoresistors. This similarity in magnetic field strength in the sensing planes of the paired magnetoresistors is advantageous.

When a magnetically permeable object passes in to or out of the detection zone of the sensor, the shape of the magnetic field provided by the permanent magnet is affected and the precise angle between the lines of magnetic flux and the sensing plane in which the magnetoresistive elements are disposed is changed. This change is reflected in a change of the resistance of the magnetoresistive elements. Because of the physical position of the magnetoresistors in the Wheatstone bridge arrangement of the resistors relative to the permanent magnet, as in a preferred embodiment of the present invention, relatively minor distortions of the lines of magnetic flux from the permanent magnet can provide recognizable signals from the Wheatstone bridge to determine the presence or absence of a magnetically permeable object in the detection zone. It should also be understood that, to a certain degree, the relative distance of a magnetically permeable object from the face of a preselected magnetic pole of the permanent magnet can be determined.

BRIEF DESCRIPTION OF THE DRAWINGS

The present invention will be more fully and completely understood from a reading of the Description of the Preferred Embodiment of the present invention in conjunction with the drawings, in which.

DESCRIPTION OF THE PREFERRED EMBODIMENT

Figure 1:
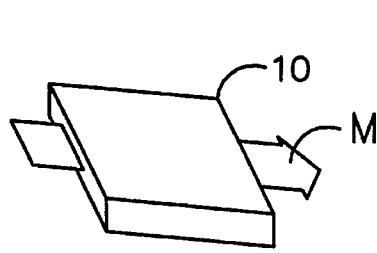
FIG. 1 is a schematic illustration of a magnetoresistive element.

Throughout the Description of the Preferred Embodiment, like components will be identified by like reference numerals.

In FIG. 1, a magnetoresistive element 10 is shown being disposed in a sensing plane. Magnetic flux which has a component in the direction of the sensing plane, as represented by arrow M, affects the electrical resistance of the magnetoresistive element 10. By appropriately connecting the magnetoresistive element in a sensing circuit, the change in its resistance can be measured and used to provide a signal which represents the strength of the magnetic field in the sensing plane.

Figure 2:
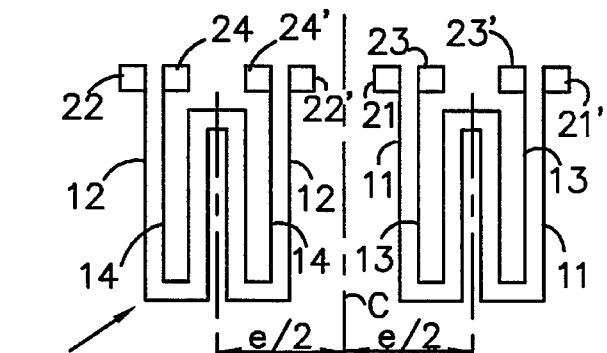
FIG. 2 is an illustration of four magnetoresistors arranged in serpentine patterns and paired to define two magnetoresistive elements.

FIG. 2 shows one possible physical configuration in which four magnetoresistors are disposed. A first magnetoresistor 11 is arranged in a serpentine, or meander-shaped, configuration. The two ends of the first magnetoresistor 11 are provided with conductive pads, 21 and 21'. A second magnetoresistor 12 is similarly configured and provided with conductive pads, 22 and 22', at its ends A third magnetoresistor 13 is nested, as shown in FIG. 2, with the first magnetoresistor 11 and provided with conductive pads, 23 and 23'. In a similar fashion, a fourth magnetoresistor 14 is nested in association with the second magnetoresistor 12 and provided with conductive pads, 24 and 24'. It should be understood that although the magnetoresistors, 11, 12, 13 and 14, are illustrated as lines in FIG. 2, they are actually deposited in the configuration shown in FIG. 2 with a preselected width and thickness which can be determined as a function of the particular characteristics of the circuit required for a particular application. The conductive pads at the ends of the magnetoresistors are used to permit the interconnections between magnetoresistors that result in a Wheatstone bridge arrangement such as that shown in FIG. 3.

The basic theory of operation of the device illustrated in

Figure 3:
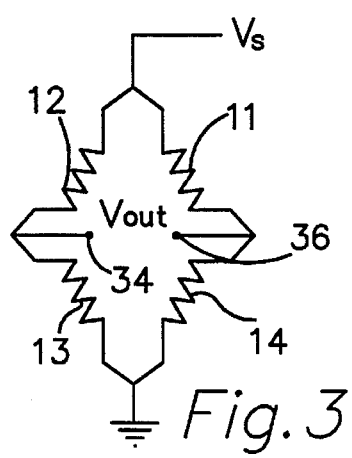
FIG. 3 is a schematic representation of a Wheatstone bridge arrange of four magnetoresistors.

FIGS. 2 and 3 is that a change in the shape and direction of the lines of magnetic flux emanating from a permanent magnet will tend to affect magnetoresistors 11 and 13 in a generally identical way and will affect magnetoresistors 12 and 14 in a generally identical way. However, the effect on the first magnetoresistive element 31 may be significantly different than the effect on the second magnetoresistive element 32. When this change in the shape and direction of the magnetic field occurs, the effect on the magnetoresistors 11 and 13 will be generally similar, but measurably different than the effect on magnetoresistors 12 and 14. If a supply voltage $V_S$ is provided across the Wheatstone bridge as shown in FIG. 3, changes in the relative resistances of the magnetoresistors will result in changes in the voltage potential identified as $V_{OUT}$. For example, if the resistances of magnetoresistors 11 and 13 are increased relative to the resistances of magnetoresistors 12 and 14, the voltage potential at point 34 will increase relative to the voltage potential at point 36. Conversely, if the resistances of magnetoresistors 12 and 14 increase relative to the resistances of magnetoresistors 11 and 13, the opposite effect will be sensed at points 34 and 36. The output voltage of the bridge can then be measured as an indication of the amount or location of magnetically permeable material within the detection zone. In the terminology used below, the first signal is the voltage potential at point 34 and the second signal is the voltage potential at point 36. The difference between those two voltage potentials provides the third signal which can be used as an indication of the amount of magnetically permeable material within the detection zone.

Figure 4:
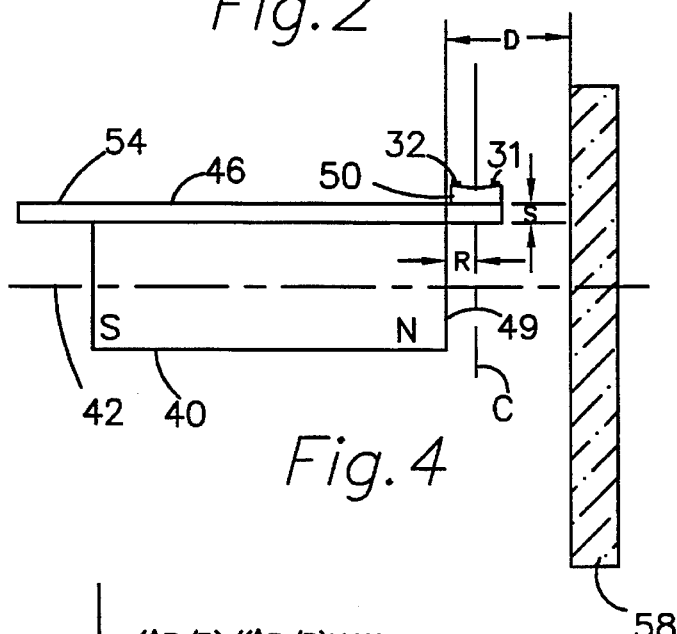
FIG. 4 is an illustration of one embodiment of the present invention.

FIG. 4 illustrates one embodiment of the present invention. A permanent magnet 40 has a north magnetic pole and a south magnetic pole with a magnetic axis 42 extending between them. The first magnetoresistive element 31 and the second magnetoresistive element 32 are disposed in a common sensing plane which is spaced apart from a lateral surface 46 of the magnet 40 by a distance S as shown. The two magnetoresistive elements, 31 and 32, are spaced apart from each other in a generally-symmetrical manner about a centerline C. The centerline is displaced from a preselected magnetic pole face by a distance R as shown in FIG. 4. Since it is often necessary to provide some type of electrical circuitry connected in association with the magnetoresistors, a silicon chip 50 is provided and the magnetoresistors are deposited on the chip 50. The chip, in turn, is attached to a ceramic substrate 54. The ceramic substrate 54 is then attached to a lateral surface 46 of the magnet. However, it should clearly be understood that alternative means are available to fix the relative positions between the magnetoresistors and the permanent magnet which do not require direct attachment of a ceramic substrate 54 to a lateral surface 46 of the magnet.

Figure 5:
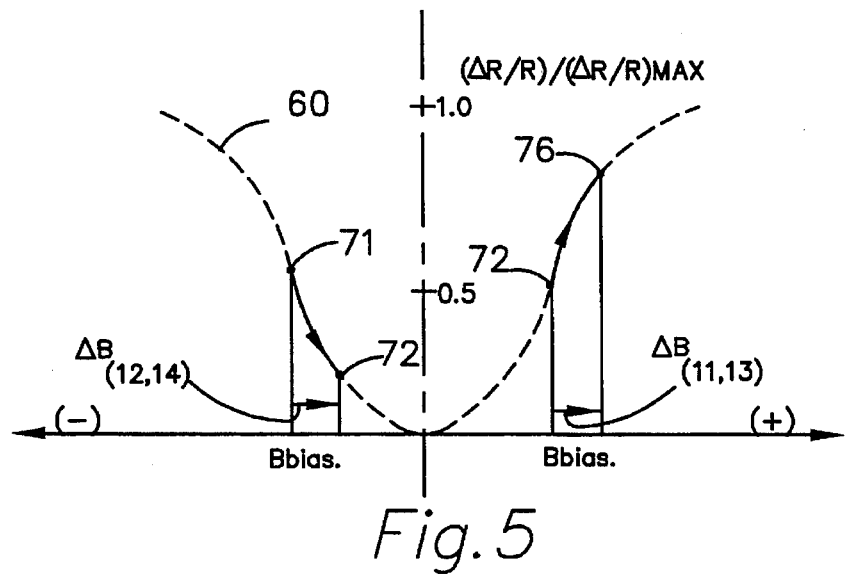
FIG. 5 is a graphical representation of a response curve for magnetoresistive elements.

With continued reference to FIG. 4, a magnetically permeable object 58 can change the shape of the magnetic field emanating from the permanent magnet 40 when it moves into the detection zone and therefore change the magnitudes of the components of the magnetic field in the sensing plane at the locations of the first and second magnetoresistive elements, 31 and 32. As will be described in greater detail below, certain applications of the present invention are benefited by arranging the magnetoresistive elements at locations that result in equal and opposite magnetic fields being imposed upon them. This type of balanced arrangement is generally preferable when the present invention is intended for use as a proximity sensor wherein the magnetically permeable object 58 moves in a direction generally parallel to the magnetic axis 42 either toward or away from the pole face 49. If the position of the magnetoresistive elements is properly selected with respect to the permanent magnet 40, the vector components of the magnetic field in the sensing plane of the magnetoresistors can be caused to be in opposite directions from each other when no target is in the detection zone. This results in the magnetic field component extending through the first magnetoresistive element 31 in a direction opposite to that of the field component extending through the magnetoresistive element 32. Distances S and R are determined as a function of the permanent magnet's dimensions, the remnant magnetic flux density and the bridge dimensions in a way which results in the magnetoresistors, 11 and 13, being biased with an opposite magnetic field direction than magnetoresistors, 12 and 14. Ideally, the opposite magnetic biasing of the magnetoresistive elements will be at a magnitude that is equal to that of the midpoint of their response curve which is illustrated in FIG. 5. The response curve 60 shown in FIG. 5 is intended as an exemplary illustration of a particular magnet. However, it should be understood that the shape of the response curve 60 can vary significantly based on the width and thickness of the magnetoresistive element 31 and 32. In addition, it should be realized that the balanced magnetic fields on the first and second magnetoresistive elements, 31 and 32, is not a requirement in all embodiments of the present invention. In fact, when the present invention is used as a geartooth sensor, certain advantages can be realized by arranging the magnetoresistive elements relative to the permanent magnet so that both magnetoresistive elements are biased in a common direction, but with different magnitudes, when no geartooth is present in the detection zone. This initial calibration with a predefined bias can be advantageous in geartooth sensors.

The response curve 60, shown in FIG. 5, represents the change in resistance of the magnetoresistors, as a percentage of their resistance, compared to the maximum possible change in resistance as a percentage of their resistance. In FIG. 5, the horizontal axis represents the magnetic field strength and direction in the sensing plane of the magnetoresistors. The vertical axis in FIG. 5, as shown, represents the relationship between the percentage change in resistance compared to the maximum possible percentage change in resistance. If the magnetic field in the sensing plane can be balanced so that it extends in opposite directions through the two magnetoresistive elements, 31 and 32, the initial magnetic field values affecting the two magnetoresistive elements can be represented by points 71 and 72. These two points show the relative change in resistance for the magnetoresistors when no magnetically permeable object is disposed within the detection zone of the sensor. When a magnetically permeable object, such as a ferrous target, moves into the detection zone, the negatively directed magnetic field affecting the second magnetoresistive element 32, changes from point 71 to point 75. This change is caused by a decrease in the magnitude of the component of the magnetic field extending in a negative direction within the sensing plane of the magnetoresistors. Simultaneously, the positive magnetic field affecting the magnetoresistors 11 and 13 is increased from point 72 to point 76.

With continued reference to FIG. 5, it should be understood that points 71 and 72 represent an absence of any magnetic material in the detection zone and point 75 and 76 represent the presence of magnetic material, such as a ferrous target, within the detection zone. The arrows illustrate the coincidental change from points 71 to 75 and from points 72 to 76 for the first and second magnetoresistive elements. As described above, this change will result in a decrease in the resistance of magnetoresistors 11 and 13 and a corresponding increase in the resistance of magnetoresistors 12 and 14. Because of the arrangement shown in FIG. 3, the output voltage $V_{OUT}$ will provide a robust signal representing this change in resistances.

As described above in conjunction with FIGS. 3, 4 and 5, it is sometimes advantageous to provide magnetic fields in equal and opposite directions through the sensing planes of the first and second magnetoresistive elements, 31 and 32, especially in applications where the present invention is used as a proximity sensor to detect the relative position of a magnetically permeable object as it moves toward or away from a pole face of the permanent magnet in a direction generally parallel to the magnetic axis 42. This permits the device to be more easily calibrated, with no target in the detection zone, and results in a general balance of the changes in resistance between the two magnetoresistive elements as represented by the general equality of points 71 and 72 in FIG. 5. As will be described below, the balancing of the magnetic field components relative to the first and second magnetoresistive elements, 31 and 32, can be accomplished by moving the magnet 40 relative to the first and second magnetoresistive elements in a direction parallel to the magnetic axis 42.

Figure 7:
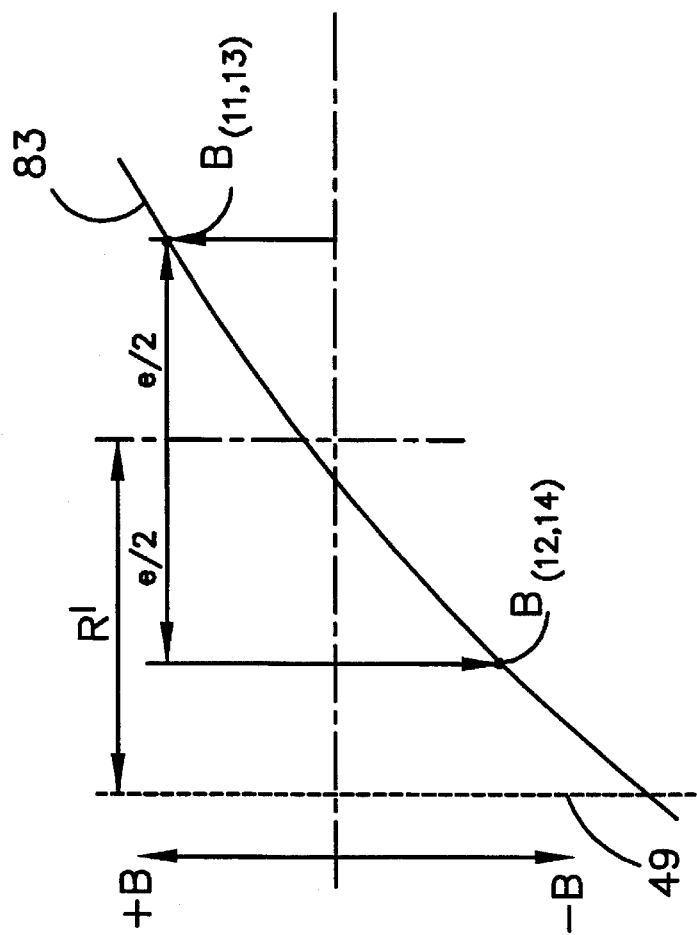
FIGS. 6 and 7 show the effects of a magnetic field on the magnetoresistors as a function of their distance from the permanent magnet pole face.
Figure 6:
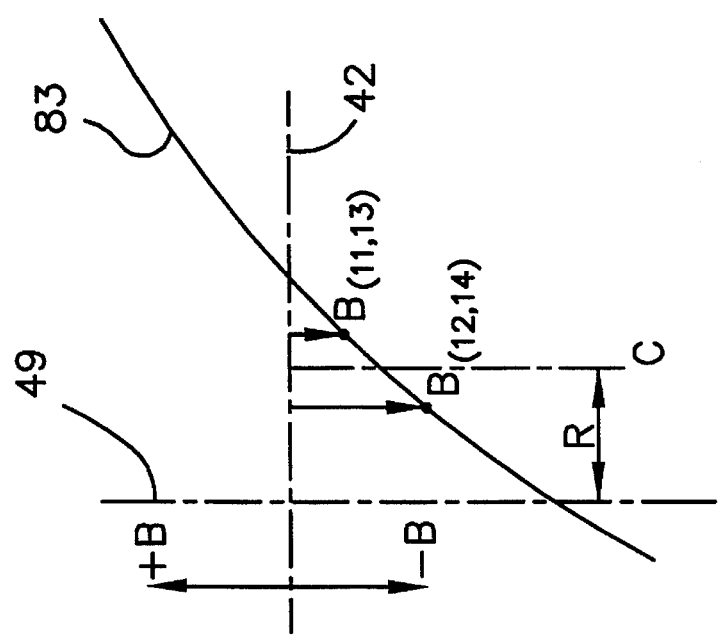

FIGS. 6 and 7 illustrate the way in which the relative magnetic field components affecting the first and second magnetoresistive elements can be adjusted, or calibrated, to achieve a particular purpose. For example, FIG. 6 shows the general type of arrangement that is particularly advantageous when the present invention is used in conjunction with a geartooth sensor. In geartooth applications, it is advantageous to have the magnetoresistive elements biased at different magnitudes even if they are both biased in the same direction. In geartooth sensors, it is preferable if magnetoresistive elements 32 is more biased, in an absolute sense, than magnetoresistive element 31, regardless of their directions of magnetic bias, when no target is in the detection zone. This permits the geartooth sensor to exhibit a power-up recognition capability. To accomplish this, the dimension R is selected to place the first and second magnetoresistive elements at the location shown in FIG. 6. Because of the magnetic relationship identified by curve 83 and the relative position of the magnet and magnetoresistive elements, both magnetoresistive elements are biased in a negative direction with different magnetic field magnitudes. If the magnetoresistive elements, 31 and 32, are moved away from the pole face 49 to the dimension identified as R', the magnetic field components affecting the magnetoresistors are shifted along curve 83 to result in generally equal magnetic fields which are directed in opposite directions as illustrated in FIG. 7. The configuration represented in FIG. 7 would be most preferable in applications wherein the present invention is used as a proximity sensor to respond to a magnetic object moving toward or away from the pole face of the permanent magnet in a direction generally parallel with the magnetic axis and the configuration represented in FIG. 6 would be more advantageous in applications of the present invention as a geartooth sensor where a magnetically permeable object moves through a detection zone proximate a magnetic pole face of a permanent magnet in a direction generally perpendicular to the magnetic axis.

Figure 8:
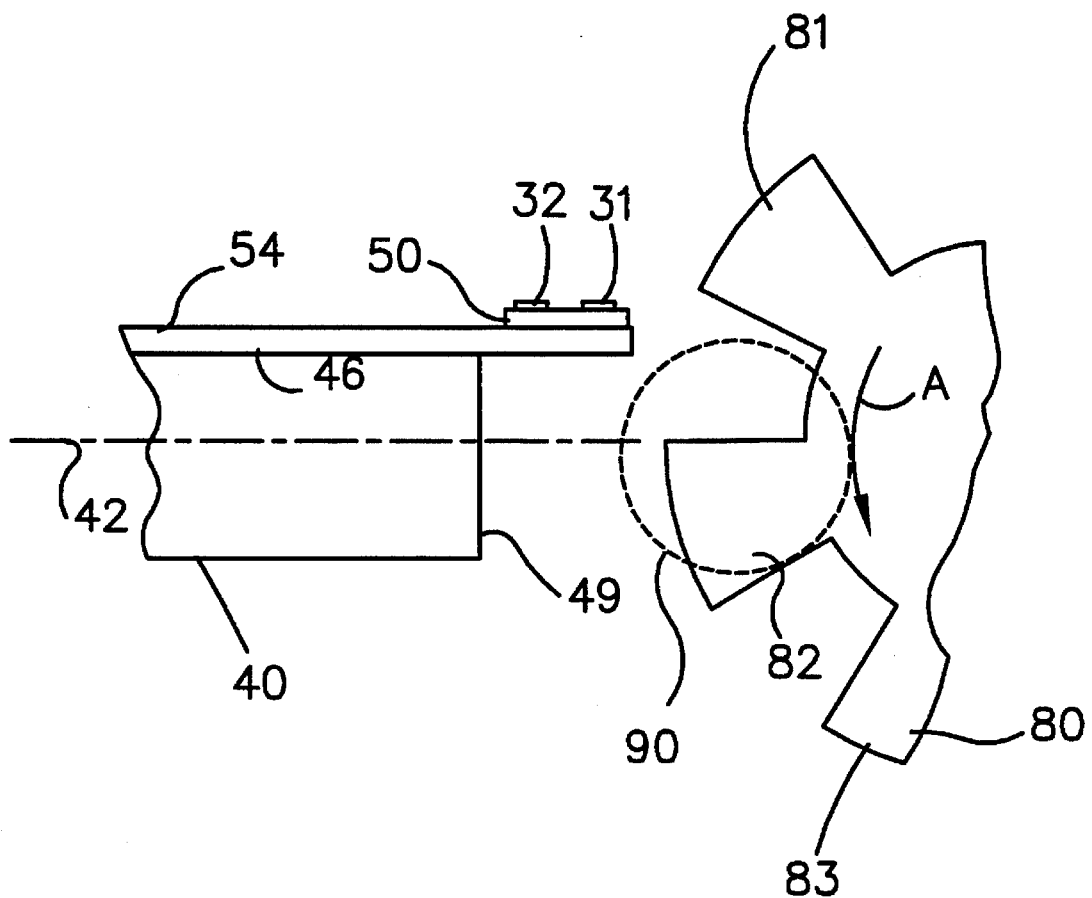
FIG. 8 shows an application of the present invention in combination with a rotatable gear.

FIG. 8 illustrates a partial view of the present invention showing the permanent magnet 40 with its pole face 49 and its magnetic axis 42, the ceramic substrate 54 which is attached to a lateral surface 46 of the permanent magnet 40, the silicon chip 50 which is attached to the ceramic substrate 54 and the first and second magnetoresistive elements, 31 and 32. In addition, a rotatable member 80 is illustrated having a plurality of teeth, 81, 82 and 83 which are positioned to move into and out of a detection zone 90 in response to rotation in the direction identified by arrow A. Although a dashed circle has been used to represent the detection zone 90 in FIG. 8, it should clearly be understood that the detection zone of the sensor is not actually bounded within a circular shape. The dashed circle in FIG. 8 is merely used to identify the general area through which a ferrous gear targets can move and be detected by the geartooth sensor. By comparing FIGS. 4 and 8, it can be seen that the ferrous target sensed by the present invention can be a magnetically permeable object 58 moving toward and away from the face 49 of magnet 40 or, alternatively, can be a tooth of a gear moving through the detection zone 90 in a direction generally parallel to the face 49 of the magnet.

Figure 14:
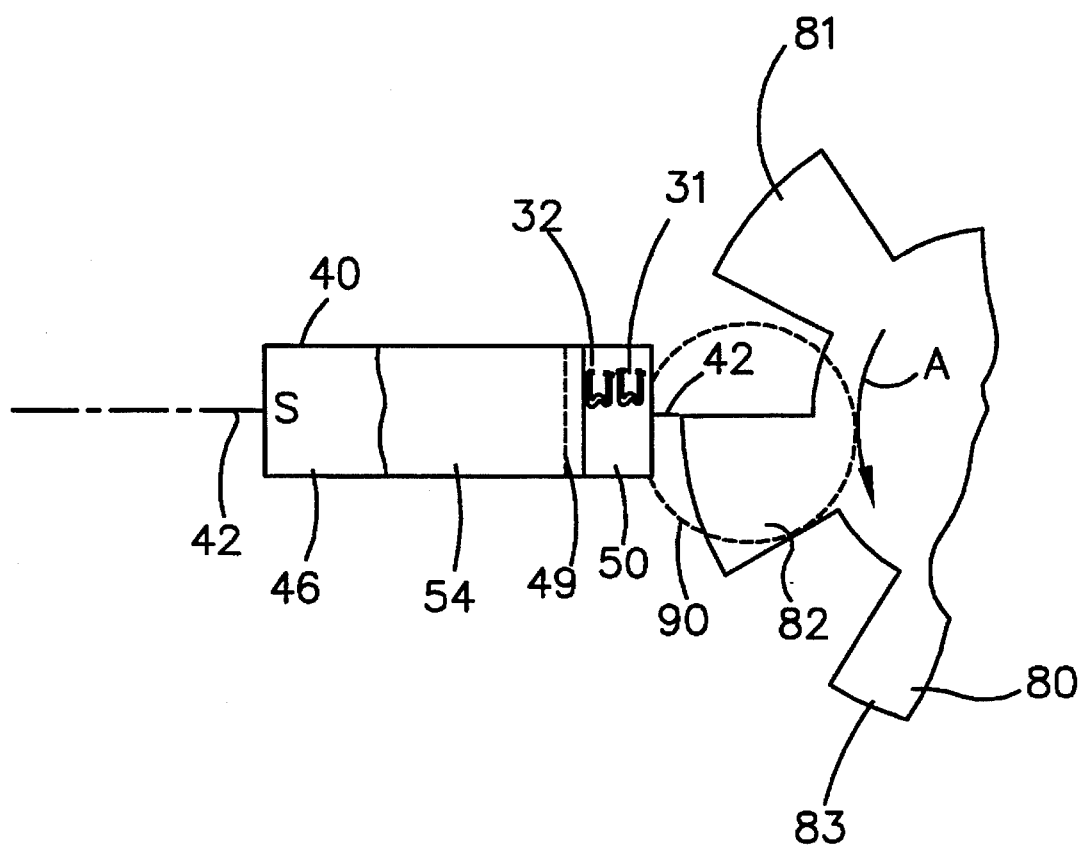
FIG. 14 is generally similar to FIG. 8 but with the sensor rotated about the magnetic axis.

The arrangement illustrated in FIG. 8 shows one particular physical relationship between the geartooth sensor and a rotating member 80. FIG. 14 shows an alternative arrangement in which the geartooth sensor is rotated by 90 degrees about the magnetic axis 42 relative to the rotatable member 80. In many applications, the arrangement shown in FIG. 14 is preferable to that shown in FIG. 8.

Figure 9:
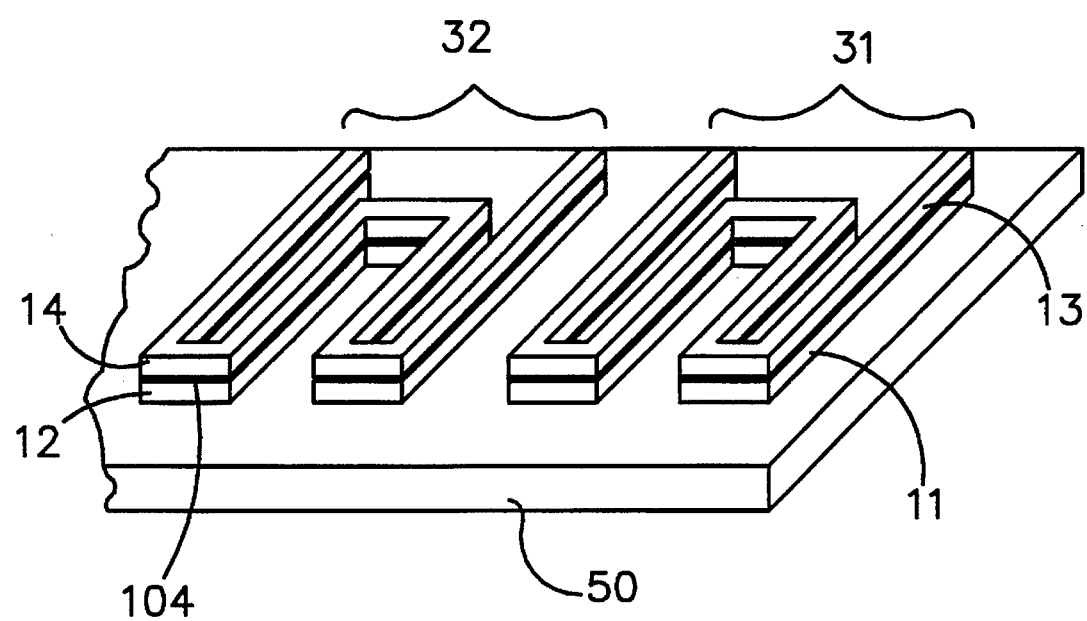
FIG. 9 illustrates one particular embodiment of the present invention in which the magnetoresistors are arranged in laminar associated pairs.

FIG. 9 also illustrates another alternative embodiment of the present invention in which the magnetoresistors are arranged in laminar association with each other to reduce the possible differences in magnetic effects on each of the paired magnetoresistors. For example, magnetoresistor 14 is deposited over magnetoresistor 12 in a laminar association. In addition, magnetoresistor 13 is deposited in laminar association on magnetoresistor 11. This arrangement results in a virtually identical magnetoresistive effect on the paired magnetoresistors when the magnetic field changes. In other words, when the magnetic field changes shape, the effect sensed by magnetoresistor 11 is virtually identical to the effect sensed by magnetoresistor 13. Similarly, the magnetic effect on magnetoresistor 12 is essentially identical to the magnetic effect on magnetoresistor 14. This virtual identity of magnetic field strengths in the paired magnetoresistors is accomplished by the close proximity that is achieved by the laminar association illustrated in FIG. 9. Between the paired magnetoresistors, a thin layer of an insulator such as silicon nitride is used to electrically isolate the paired resistors from each other. The silicon nitride insulative layer is identified by reference numeral 104 in FIG. 9. The electrically conductive pads, 21, 22, 23, 24, 21', 22', 23' and 24' are not illustrated in FIG. 9.

Figure 10:
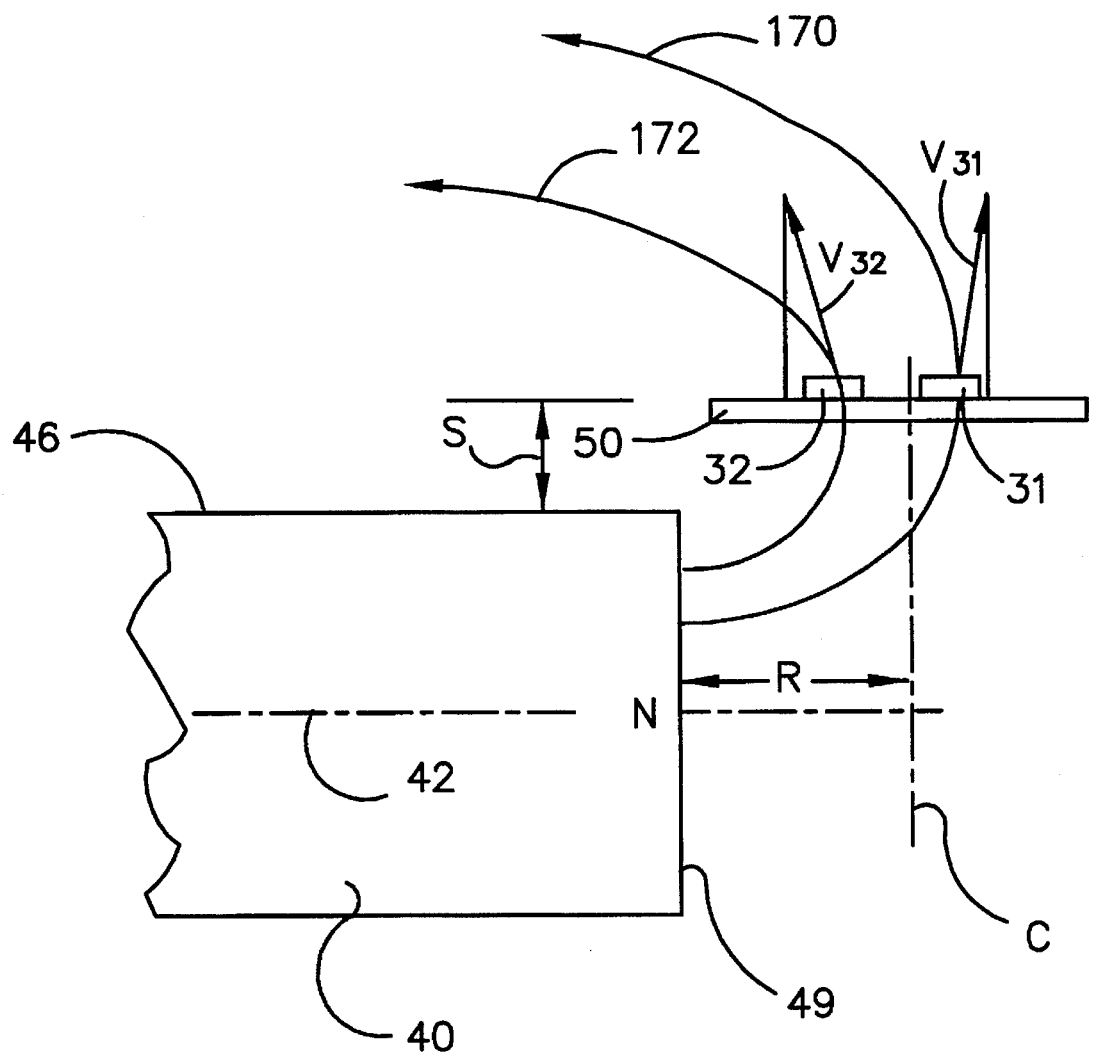
FIG. 10 illustrates two representative lines of flux emanating from a permanent magnet and passing through magnetoresistive elements.

FIG. 10 is a schematic representation of the effects sensed by the magnetoresistor elements, 31 and 32, as a result of their relationship to a permanent magnet 40. For purposes of the illustration, only two lines of magnetic flux, 170 and 172, are shown in FIG. 10. However, these two magnetic flux lines represent the general shape of the entire magnetic field in the region of the first and second magnetoresistive elements. As can be seen, magnetic flux line 170 passes through magnetoresistive element 31 in a direction that has a resultant vector $V_{31}$ and magnetic flux line 172 passes through magnetoresistive element 32 in a direction that has a resultant vector $V_{32}$. These two resultant vectors have components within the sensing plane of the magnetoresistive elements that extend in opposite directions. The relevant component of vector $V_{31}$ extends in a direction within the sensing plane of magnetoresistive element 31 in a direction generally away from the permanent magnet 40. The component of the resultant vector $V_{32}$ extends within the sensing plane of magnetoresistive element 32 in a direction generally toward the permanent magnet 40. By moving the magnetoresistive elements relative to the permanent magnet 40 in a direction parallel to the magnetic axis 42, the relationship between the magnetic field strengths within the sensing plane of the magnetoresistive elements can be changed. This phenomenon was described above in conjunction with FIGS. 6 and 7.

Figure 11:
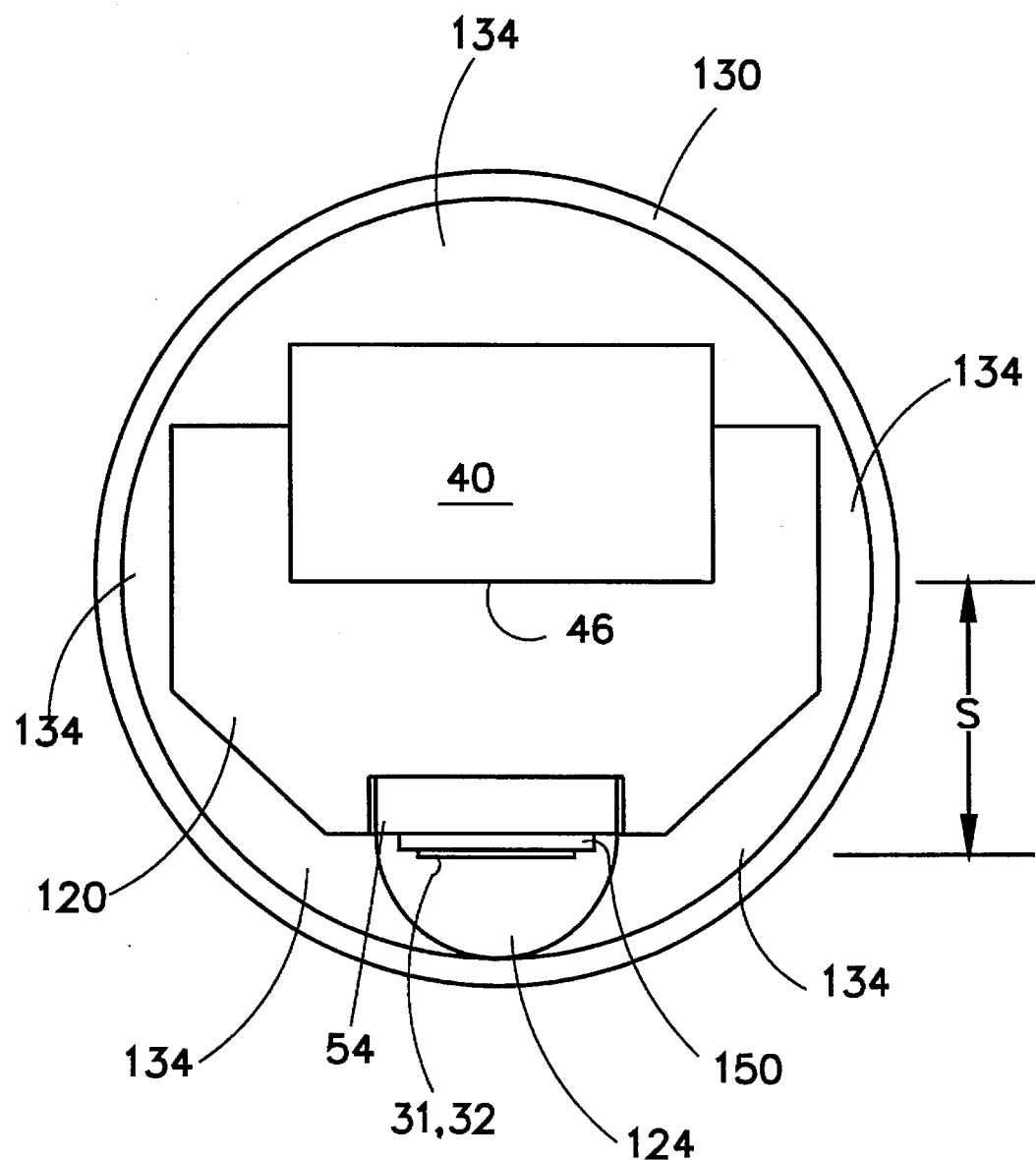
FIG. 11 is a sectional view of one particular physical configuration of the present invention disposed within a cylindrical housing.

FIG. 11 shows a sectional view of one particular physical embodiment of the present invention. The permanent magnet is spaced apart from the magnetoresistive elements, 31 and 32, by a holder 120 which can be made of plastic or any other suitable nonmagnetic material. The dimensions of the holder 120 are selected to retain the permanent magnet 40 in a proper position and displace the magnetoresistive elements, 31 and 32, at a preselected distance S from a lateral surface 46 of the permanent magnet 40. A suitable elastomeric material 124 can be disposed over the magnetoresistive elements and their related circuitry and wire bonds to protect those components during the assembly process. When the holder 120, permanent magnet 40 and related magnetoresistive elements are arranged as shown in FIG. 11, assembly can be inserted into an appropriate housing 130 such as a plastic tube.

The arrangement shown in FIG. 11 permits the permanent magnet and the ceramic substrate 54 to be moved relative to each other along the direction parallel to the magnetic axis 42 in order to calibrate the signals received from the magnetoresistive elements, 31 and 32, and to achieve the desired relationships between the magnetic field strengths affecting each of the magnetoresistive elements. When this desired relationship is achieved, the components shown in FIG. 11 can be rigidly attached to each other. When the magnet 40 and magnetoresistive elements, 31 and 32, are rigidly attached relative to each other and the assembly is disposed within a housing 130, the remaining space between the inner surface of the housing 130 and the components of the sensor can be filled with a suitable potting material to rigidly and permanently attach all of the components to each other. The spaces identified by reference numeral 134 in FIG. 11, which surround the magnet and magnetically resistive components would be filled with this potting material.

Figure 12:
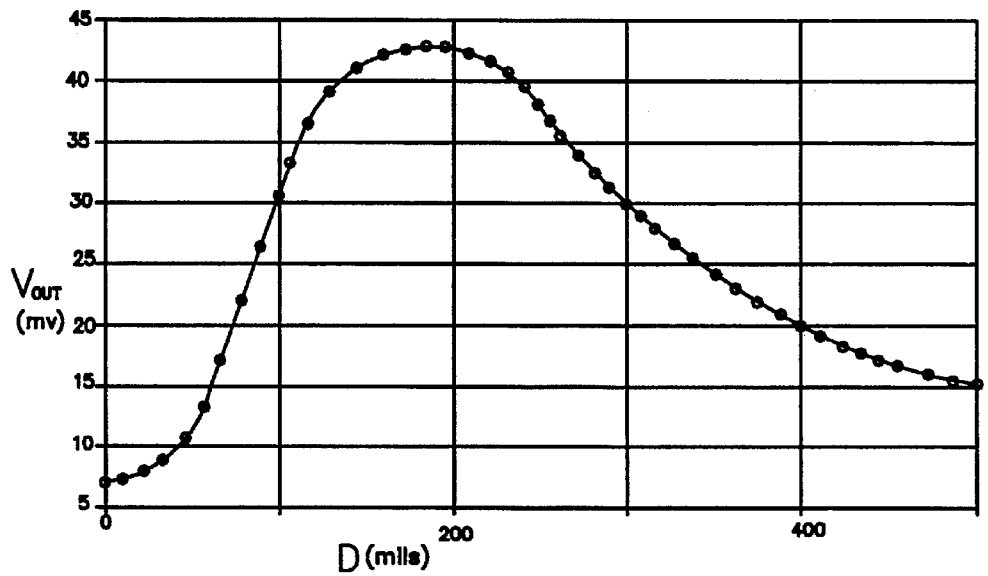
FIG. 12 is a graphical representation showing the relationship between the output signal of a Wheatstone bridge and the distance of a ferrous target from the face of a permanent magnet.

FIG. 12 illustrates the output $V_{OUT}$ of the Wheatstone bridge, shown in FIG. 3, as a function of the distance D between the face of the housing and the magnetically permeable object 58. FIG. 12 illustrates the suitability of the present invention for use in detecting the presence of a magnetically permeable object 58 in the detection zone and, in certain applications, for determining the actual distance between the magnetically permeably object 58 and the face 49 of the permanent magnet 40. The relationship shown in FIG. 12 illustrates that the present invention can operate as a proximity sensor that enables a certain degree of capability to identify the distance between magnetically permeable objects and the face of the sensor housing.

Figure 13:
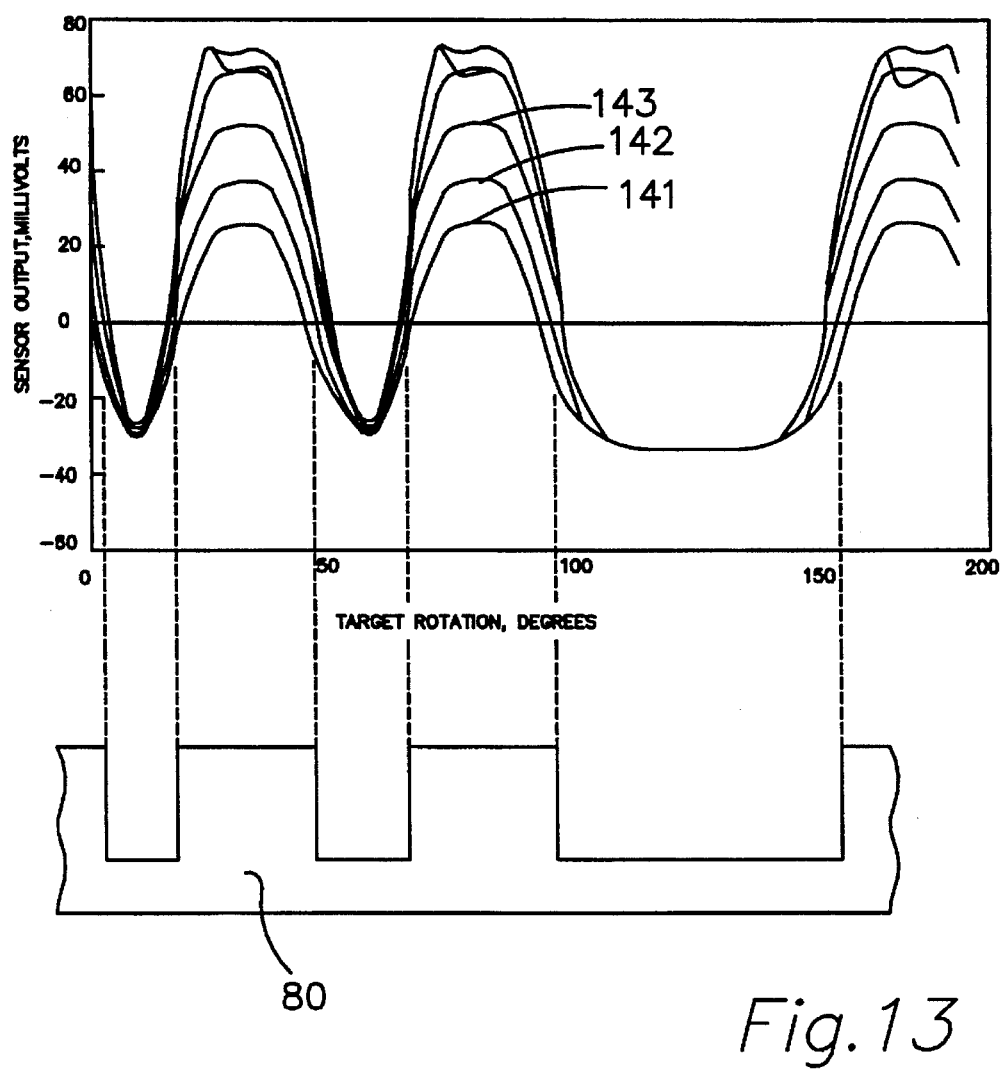
FIG. 13 shows a graphical representation of the output signal from a Wheatstone bridge as a function of the rotation of a plurality of teeth and slots through a detection zone of the present invention.

FIG. 13 illustrates the results of an alternative application of the present invention which is generally similar to that illustrated in FIG. 8. When a toothed target is moved past the sensor and the teeth of a gear are rotated through the detection zone, the present invention permits the results shown in FIG. 13 to be obtained. The toothed object 80 is illustrated in a linear arrangement instead of a rotatable gear configuration for the purpose of simplifying the illustration and more clearly relating the location of the teeth to the variations in sensor output. FIGS. 12 and 13 illustrate the capability of the present invention to operate either as a proximity sensor or a geartooth sensor. As discussed above, when the present invention is intended for use as a proximity sensor the first and second magnetoresistive elements are advantageously located at positions relative to the permanent magnet to achieve a general balance of magnetic field components as represented in FIG. 7. If, on the other hand, the present invention is intended for use as a geartooth sensor, the relative locations of the magnetoresistive elements relative to the permanent magnet are chosen to result in the relationships shown in FIG. 6.

The present invention, when used as a geartooth sensor, benefits from having a magnetic bias imposed on the two magnetoresistive elements at different magnitudes. In other words, the two magnetoresistive elements are affected by magnetic fields of different magnitudes regardless of their direction. By providing this different magnetic field strength imposed on each of the two magnetoresistive elements, the geartooth sensor can be provided with power-up recognition capability. This means that the geartooth sensor can identify the presence or absence of a tooth within the detection zone without requiring that the gear be moved. The different magnetic fields imposed on the two magnetoresistive elements when no ferrous object is in the detection zone creates the bias which gives the geartooth sensor the power-up recognition capability.

With continued reference to FIG. 13, it can be seen that a family of curves are shown representing the sensor output as a function of the presence or absence of teeth in the detection zone. The curves represent different air gaps between the teeth and the face of the sensor. For example, curve 141 represents a gap of 0.100 inches between the sensor face and the teeth, curve 142 represents a gap of 0.080 inches and curve 143 represents a gap of 0.060 inches. The curves illustrated in FIG. 13 are intended to show the effect on the intensity of the signal that a change in gap can cause. Naturally, the actual precise magnitudes of the output signals $V_{OUT}$ will vary significantly as a function of many different parameters such as magnet strength, distance S, magnet dimensions, magnetic permeability of the target and many other variables. However, the illustration in FIG. 13 shows that the present invention can be used to discriminate between teeth and slots and, in addition, can provide this information without the necessity of moving the gearteeth or the target.

Figure 15:
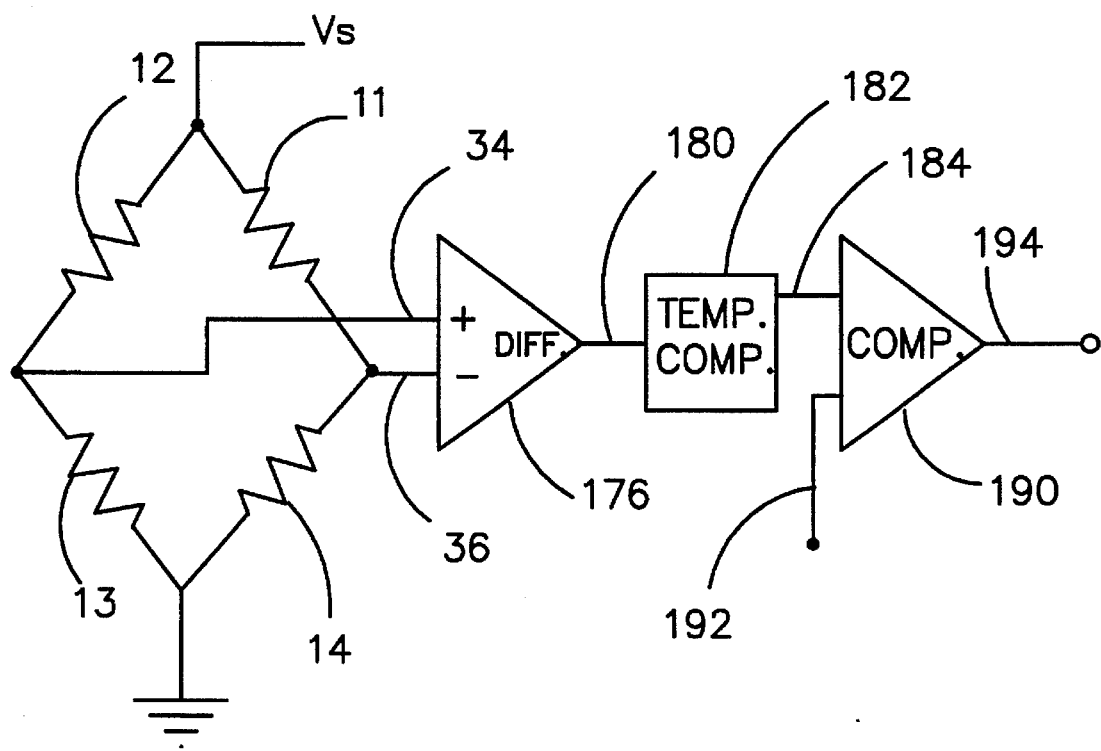
FIG. 15 is an exemplary electrical circuit showing one possible embodiment of the present invention which converts two signals from a Wheatstone bridge into a third signal that represents the presence or absence of a magnetically permeable object in the detection zone of the sensor.

FIG. 15 illustrates an exemplary circuit that can be used in association with the present invention to respond to the first and second signals and provide a third signal that represents the presence or absence of a magnetic object in the detection zone or, alternatively, can represent the relative distance between a magnetically permeable object and the face of a sensor incorporating the present invention. The Wheatstone bridge arrangement shown in FIG. 15 provides a first signal on line 34 and a second signal on line 36 to a differential amplifier 176. The differential amplifier provides a signal, on line 180, which is used as an input to a temperature compensation portion 182 of the circuit. The output from the temperature compensation portion 182 of the circuit is provided, on line 184, to a comparator 190. The comparator also has an input connected to a reference, as represented by line 192. In a preferred embodiment of the present invention, the comparator 190 is provided with hysteresis to facilitate the provision of an output signal on line 194 that is usable to detect the presence or absence of a geartooth within the detection zone of the sensor. The components shown in FIG. 15 being associated with the Wheatstone bridge are very well known to those skilled in the art and represent only one of many combinations of components that can be used to provide a third signal as a function of the first and second signals which represents the presence or absence of a magnetically permeable object within the detection zone or, alternatively, represents the relative distance between a magnetically permeable object and a face of the sensor.

Although the present invention has been illustrated with particular specificity and described to explain certain preferred embodiments of the present invention in explicit detail, it should be understood that alternative embodiments of the present invention are also within its scope.

The embodiments of the invention in which an exclusive property or right is claimed are defined as follows:

1. A sensor, comprising:

a permanent magnet having a north magnetic pole and a south magnetic pole with a magnetic axis extending therebetween;

a detection zone located external to said permanent magnet and displaced from a preselected one of said north and south magnetic poles, said magnetic axis extending through said detection zone;

a first magnetoresistive element disposed in a sensing plane, said sensing plane being generally parallel to said magnetic axis;

a second magnetoresistive element disposed in said sensing plane, said sensing plane being displaced from said permanent magnet in a direction perpendicular to said magnetic axis, said first and second magnetoresistive elements being spaced apart from each other, a portion of said second magnetoresistive element extending past a preselected one of said north and south magnetic poles of said permanent magnet in a direction away from said permanent magnet; and means for comparing first and second signals from said first and second magnetoresistive elements and providing a third signal which is representative of the amount of magnetically permeable material in said detection zone, said first magnetoresistive element comprising first and third magnetoresistors, said second magnetoresistive element comprising second and fourth magnetoresistors.

2. The sensor of claim 1, wherein:

said first and second magnetoresistive elements are displaced from said preselected one of said north and south poles in a direction toward said detection zone.

3. The sensor of claim 1, wherein:

said comparing means is a Wheatstone bridge comprising said first and second magnetoresistive elements.

4. The sensor of claim 1, wherein:

said first and fourth magnetoresistors are connected electrically in series to form a first leg of a Wheatstone bridge.

5. The sensor of claim 4, wherein:

said second and third magnetoresistors are connected electrically in series to form a second leg of said Wheatstone bridge, said first and second legs of said Wheatstone bridge being connected electrically in parallel with each other.

6. The sensor of claim 4, wherein:

said first and third magnetoresistors are disposed in laminar association with each other in parallel planes; and said second and fourth magnetoresistors are disposed in laminar association with each other in parallel planes.

7. A sensor, comprising:

a permanent magnet having a north magnetic pole and a south magnetic pole with a magnetic axis extending therebetween, said permanent magnet having a lateral surface which is generally parallel to said magnetic axis;

a detection zone located external to said permanent magnet and displaced from a preselected one of said north and south magnetic poles, said magnetic axis extending through said detection zone;

a first magnetoresistive element disposed in a sensing plane, said sensing plane being generally parallel to said magnetic axis;

a second magnetoresistive element disposed in said sensing plane, said first and second magnetoresistive elements comprising permalloy material, said sensing plane being displaced from said lateral surface of said permanent magnet, said first and second magnetoresistive elements being spaced apart from each other, at least one of said first and second magnetoresistive elements extending past a preselected one of said north and south magnetic poles of said permanent magnet in a direction away from said permanent magnet and in a direction toward said detection zone; and means for comparing the effective magnetic fields imposed on said first and second magnetoresistive elements and providing an output signal which is representative of the amount of magnetically permeable material in said detection zone, said first magnetoresistive element comprising first and third magnetoresistors, said second magnetoresistive element comprising second and fourth magnetoresistors.

8. The sensor of claim 7, wherein:

said comparing means is a Wheatstone bridge having said first and second magnetoresistive elements as legs thereof.

9. The sensor of claim 7, wherein:

said first and fourth magnetoresistors are connected electrically in series to form a first leg of a Wheatstone bridge; and said second and third magnetoresistors are connected electrically in series to form a second leg of said Wheatstone bridge, said first and second legs of said Wheatstone bridge being connected electrically in parallel with each other.

10. The sensor of claim 7, wherein:

said first and third magnetoresistors are disposed in laminar association with each other; and said second and fourth magnetoresistors are disposed in laminar association with each other.

11. A sensor, comprising:

a permanent magnet having a north magnetic pole and a south magnetic pole with a magnetic axis extending therebetween, said permanent magnet having a lateral surface which is generally parallel to said magnetic axis;

a detection zone located external to said permanent magnet and displaced from a preselected one of said north and south magnetic poles, said magnetic axis extending through said detection zone;

a first magnetoresistive element disposed in a sensing plane, said sensing plane being generally parallel to said magnetic axis, said first magnetoresistive element comprising first and third magnetoresistors;

a second magnetoresistive element disposed in said sensing plane, said second magnetoresistive element comprising second and fourth magnetoresistors, said first and second magnetoresistive elements comprising permalloy material, said sensing plane being displaced from said lateral surface of said permanent magnet, said first and second magnetoresistive elements being spaced apart from each other about a centerline, said centerline being displaced from a preselected one of said north and south magnetic poles of said permanent magnet in a direction away from said permanent magnet and in a direction toward said detection zone, said first and fourth magnetoresistors being connected electrically in series to form a first leg of a Wheatstone bridge, said third and fourth magnetoresistors being connected electrically in series to form a second leg of said Wheatstone bridge, said first and second legs of said Wheatstone bridge being connected electrically in parallel with each other; and means for comparing the effective magnetic fields imposed on said first and second magnetoresistive elements and providing an output signal which is representative of the amount of magnetically permeable material in said detection zone.

12. The sensor of claim 11 wherein:

said first and third magnetoresistors are disposed in laminar association with each other; and said second and fourth magnetoresistors are disposed in laminar association with each other.

13. The sensor of claim 11, further comprising:

a rotatable gear having a plurality of magnetically permeable teeth.

* * * * *